United States Patent
Tamura

(10) Patent No.: US 6,950,127 B1
(45) Date of Patent: Sep. 27, 2005

(54) DIGITAL CAMERA

(75) Inventor: Tomoaki Tamura, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/084,007

(22) Filed: May 26, 1998

(30) Foreign Application Priority Data

May 27, 1997 (JP) .................................. 9-136598

(51) Int. Cl.[7] .......................... H04N 5/228; H04N 3/28
(52) U.S. Cl. .................................. 348/222.1; 348/207.1
(58) Field of Search .............................. 348/272, 273, 348/441, 442, 443, 445, 231, 220, 222.1, 348/231.99, 231.7, 220.1, 207.1, 333.11, 348/552

(56) References Cited

U.S. PATENT DOCUMENTS

| | | | | |
|---|---|---|---|---|
| 5,325,131 A | * | 6/1994 | Penney | 348/445 |
| 5,361,099 A | * | 11/1994 | Kim | 348/443 |
| 5,473,381 A | * | 12/1995 | Lee | 348/443 |
| 5,631,701 A | * | 5/1997 | Miyake | 348/231 |
| 6,085,112 A | * | 7/2000 | Kleinschmidt et al. | 455/556 |
| 6,111,605 A | * | 8/2000 | Suzuki | 348/220 |
| 6,535,243 B1 | * | 3/2003 | Tullis | 348/207.1 |

* cited by examiner

*Primary Examiner*—Aung Moe
(74) *Attorney, Agent, or Firm*—Finnegan, Henderson, Farabow, Garrett & Dunner, L.L.P.

(57) ABSTRACT

A camera is provided with a photographing element for converting photoelectrically image information of a object into electrical signals and for outputting first image data; first image processor for converting the first image data into second image data in first format; second image processor for converting third image data in second format different from the first format into fourth image data in third format different from the first format and the second format; and third image processor for converting the first image data into fifth image data in the third format.

6 Claims, 3 Drawing Sheets

FIG. 2 (a)

| R, G, B | R, G, B | R, G, B | R, G, B |
|---|---|---|---|
| R, G, B | R, G, B | R, G, B | R, G, B |
| R, G, B | R, G, B | R, G, B | R, G, B |
| R, G, B | R, G, B | R, G, B | R, G, B |

FIG. 2 (b)

| Y, Cb, Cr | Y | Y, Cb, Cr | Y |
|---|---|---|---|
| Y, Cb, Cr | Y | Y, Cb, Cr | Y |
| Y, Cb, Cr | Y | Y, Cb, Cr | Y |
| Y, Cb, Cr | Y | Y, Cb, Cr | Y |

FIG. 2 (c)

| Y, Cb, Cr | Y | Y, Cb, Cr | Y |
|---|---|---|---|
| Y | Y | Y | Y |
| Y, Cb, Cr | Y | Y, Cb, Cr | Y |
| Y | Y | Y | Y |

DIGITAL CAMERA

BACKGROUND OF THE INVENTION

Present invention relates to a digital camera, and more particularly, to a digital camera equipped with an image display section.

In the case of a conventional digital camera of a popularized type, a CCD having 300,000–400,000 pixels has been used as an image pickup element, and therefore, image data have been with about 640×480 pixels.

For the foregoing, however, a digital camera employing a CCD with 1,000,000 or more pixels has made it appearance in recent years, and image data with 1280×1000 pixels or more have become relatively inexpensive.

As a trend toward higher number of pixels advances, image data grow greater in amount, which requires operation to compress, for the storage purpose, the images picked up, and requires much time for the operation conducted to reproduce the recorded image data.

For making data amount to be small without sacrificing resolution, there have been proposed some systems as an image file format standard (Exif) of a digital still camera. The term "Exif" means a file format to regulate so as to memorize simultaneously information regarding F-No. of a camera, a shutter speed and etc. when data are compressed in accordance with JPEG.

Some of the image file formats are shown in FIG. 2. In FIG. 2, an area surrounded by each frame is assumed to correspond to one pixel in image pickup (sampling).

FIG. 2(a) shows one wherein R, G and B are sampled equally in each pixel, and it is an image file format called RGB 4:4:4. Here, sampling is conducted by detecting luminance components and color components equally. In this case, data tend to be large in amount though also colors are reproduced with fidelity.

FIG. 2(b) shows one for sampling luminance (Y) components and color difference (Cr (Y–R), Cb (Y–B)) components, and for sampling further color difference components on a point-sequential basis, and it is an image file format called YCbCr 4:2:2. Here, the sampling is conducted by detecting luminance components on all pixels and by detecting color difference components on a point-sequential basis, which is characterized that data can be made small in amount though color reproduction is somewhat sacrificed, in this case.

FIG. 2(c) shows one for sampling color difference on a point-sequential basis and on a line-sequential basis concerning luminance (Y) components and color difference (Cr (Y–R), Cb (Y–B)) components, and it is an image file format called YCbCr 4:2:0. Here, the sampling is conducted by detecting luminance components on all pixels and by detecting color difference components on a point-sequential basis and on a line-sequential basis, which is characterized that data can further be made small in amount though color reproduction is sacrificed, in this case.

Incidentally, since compression is made by a block of 8×8 pixels, the number of pixels in the lateral direction is a multiple of 16 and the number of pixels in the longitudinal direction is a multiple of 8, which is prescribed in the stipulation of Exif.

In the case of a digital camera, there are some image file formats as stated above, and the number of pixels of image data varies depending on the type of the camera.

Accordingly, image data obtained by photographing with various digital cameras can be read by a computer, but there has been no consideration for utilization of image data between digital cameras each being different in type.

Namely, even in the case where a common memory card can be used between digital cameras each being different, there has been a problem that an image obtained through photographing by a certain digital camera can not be reproduced on a display of another digital camera.

SUMMARY OF THE INVENTION

The present invention has been achieved in view of the problems mentioned above, and its object is to realize a digital camera capable of reproducing also image data in the image file formats of different standards.

The term "standard" means an image data format obtained by photographing by a camera. That is, the image data having a data format different from that of the image data obtained by the photographing by the camera are made it possible to be reproduced or displayed. For example, image data obtained by photographing by a different type camera from the above camera, in particular, image data obtained by photographing by a different type camera having a different data format from the above camera, or image data obtained by a device other than the camera, for example, image data of a map is made it possible to be reproduced or displayed.

Namely, the invention constituting a means to solve the problem is represented by the following structures (1)–(4).

(1) A digital camera provided with an image pickup means which photographs an object and generates image signals and with an image processing means which generates digital image data for recording by providing prescribed processing to the image signals generated by the image pickup means and generates color image signals for reproduction by providing prescribed processing to the digital image data, wherein a recording format capable of recording in a prescribed form and a reproducing format capable of reproducing in a prescribed form are prescribed in the image processing means, and the number of kinds of the reproducing format is greater than that of the recording format.

In this digital camera, the recording format capable of recording in a prescribed form and the reproducing format capable of reproducing in a prescribed form are determined, and the number of kinds of the reproducing format is arranged to be greater than that of the recording format. As a result, image data in the image file formats of different standards can also be reproduced.

(2) A digital camera provided with an image pickup means which photographs an object and generates image signals and with an image processing means which generates digital image data for recording composed of luminance components and color difference components by providing prescribed processing to the image signals generated by the image pickup means and generates color image signals for reproduction by providing prescribed processing to the digital image data composed of luminance components and color difference components, wherein the image processing means is provided with a first mode to record and reproduce digital image data having prescribed number of pixels and a second mode to reproduce digital image data having less number of pixels than in the first mode.

In this digital camera, the first mode to record and reproduce digital image data having prescribed number of pixels and the second mode to reproduce digital image data having less number of pixels than in the first mode are provided. As a result, image data in the image file formats of different standards can also be reproduced.

(3) A digital camera provided with an image pickup means which photographs an object and generates image signals and with an image processing means which generates digital image data for recording composed of luminance components and color difference components by providing prescribed processing to the image signals generated by the image pickup means and generates color image signals for reproduction by providing prescribed processing to the digital image data composed of luminance components and color difference components, wherein the image processing means is provided with a first mode to record and reproduce digital image data having prescribed number of pixels with luminance components and color difference components both in prescribed quantity of information and a second mode to reproduce digital image data having less number of pixels than in the first mode and being composed of color difference components whose information quantity is greater than that in the first mode.

In this digital camera, there are provided the first mode to record and reproduce digital image data having prescribed number of pixels with luminance components and color difference components both in prescribed quantity of information and the second mode to reproduce digital image data having less number of pixels than in the first mode and being composed of color difference components whose information quantity is greater than that in the first mode. As a result, it is possible to realize a digital camera capable of reproducing even image data in the image file formats of different standards.

(4) The digital camera according to the aforesaid items (1)–(3), wherein a display means to display color image signals for reproduction which are generated by the image processing means is provided.

This digital camera is provided with an image processing means capable of reproducing even image data in the image file formats of different standards as in the aforesaid structures (1)–(3), and is arranged so that color image signals generated by the image processing means may be displayed by a display means, which makes it possible to realize a digital camera capable of reproducing even image data in the image file formats of different standards.

BRIEF DESCRIPTION OF THE DRAWINGS

FIGS. 2(a) to 2(c) are illustrations showing examples of an image file format of a digital camera.

DETAILED DESCRIPTION OF THE PREFERRED EMBODIMENT

A digital camera of the invention will be explained with reference to drawings.

(Structure of an electronic still camera)

Here, general structures of the digital camera to which an embodiment of the invention is applied will be explained first with reference to FIG. 1.

Figure 1:
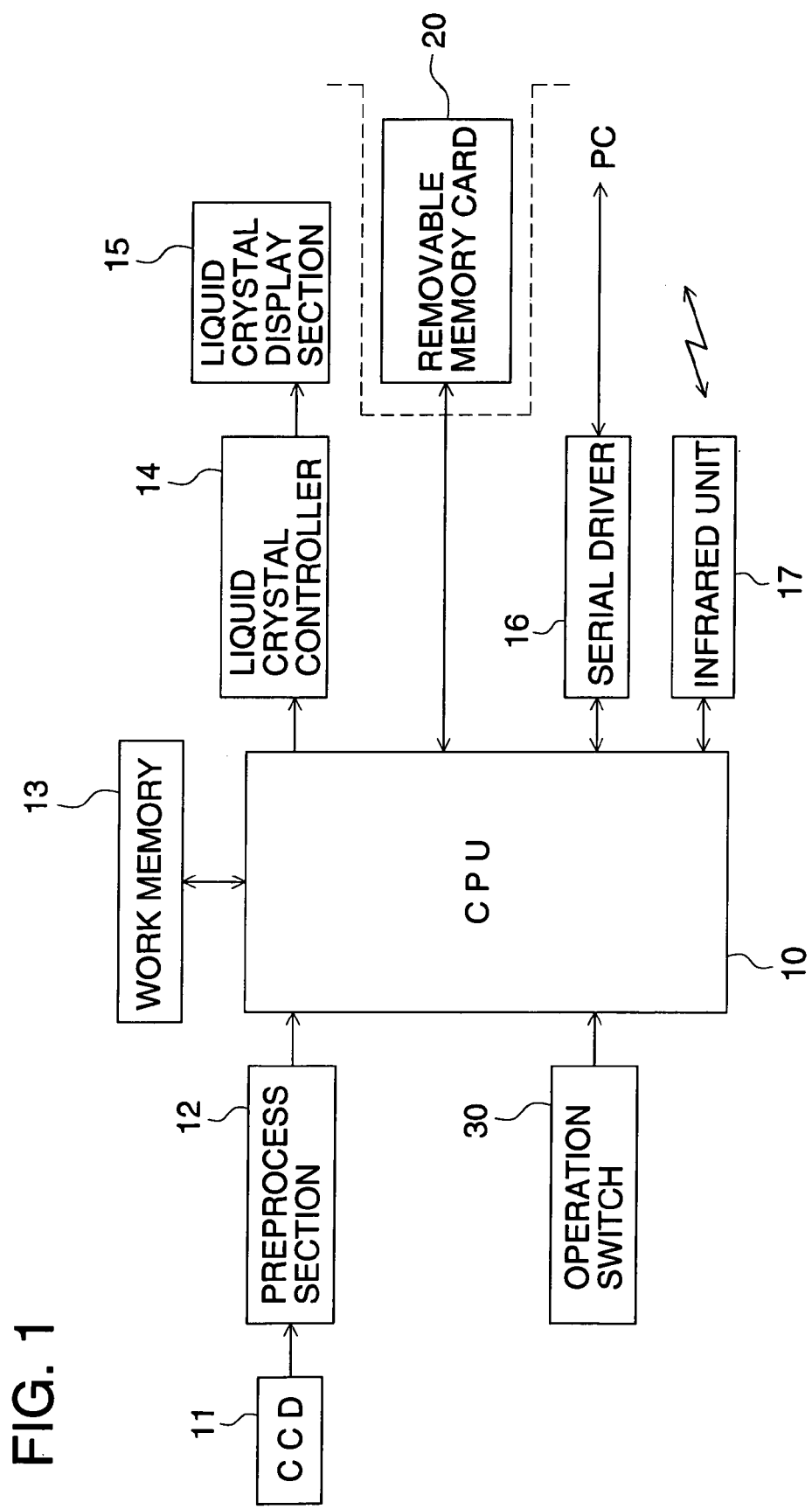
FIG. 1 is a block diagram showing each electrical structure of each function block of a digital camera used in an embodiment of the invention.

FIG. 1 is a function block diagram showing general and electric schematic structures of an electronic still camera representing an embodiment of the invention.

In the electronic still camera shown in FIG. 1, an optical image obtained through an unillustrated optical system is formed on a photoreceptor surface of CCD11 which then converts photoelectrically the optical image formed on the photoreceptor surface into an amount of electric charges, thus analog image signals are outputted by transfer pulses coming from a driving circuit.

CCD 11 is an example of photographing element. As the photographing element and image pickup means, any means which can convert optical image information of a subject into electric signals and output the signals may be used.

The outputted analog image signals are reduced in terms of noise by CDS (correlation double sampling) processing in preprocess section 12, then are adjusted in terms of gain by AGC, and are subjected to processing for extension of a dynamic range. Then, the analog image data are converted to digital image data by a built-in A/D converter and supplied to CPU10.

The CPU10 constitutes an image processing means which represents a characteristic section in the present embodiment to represent one conducting various image processings in accordance with operation programs, and it conducts various image processings (generation of digital image data for preservation, generation of digital image data for display, etc.) by conducting compression/extension of digital image data by the use of work memory 13.

In this embodiment, CPU 10 performs both a function of image processing means to produce storage image data and a function of image processing means to produce display image data. However, the above two sets of image processing means may be provided separately. Further, the image processing of the present invention may be attained by a hardware or by a software.

Incidentally, luminance processing and color processing are conducted by the CPU10, and digital image data from preprocess section 12 are converted to digital image data having prescribed format of luminance (Y) components and color difference (Cr, Cb) components.

The CPU10 further controls photographing sequence, recording sequence and reproduction sequence, and in case of need, it further controls compression and reproduction of photographing images and controls serial port transmission. As an image file format in this case, JPEG system and TIFF system are assumed to be used.

Liquid crystal controller 14 conducts the control to display digital image data for display coming from CPU10 on liquid crystal display section 15, and the liquid crystal display section 15 displays digital image data for display as a color image.

Serial driver 16 is one to conduct signal conversion for information transmission between a digital camera and external equipment (computers and others). As serial transmission, those using RS232 are assumed in this case, though there are available recommended standards for serial communication such as RS-232C and RS-422A.

Infrared unit 17 is one to conduct information transmission with external equipment (portable information equipment equipped with similar infrared units (PDA), a public telephone and printers) utilizing infrared rays, and there are standards of IrDA system and ASK system. Further, an infrared unit for automatic focusing may be used as the infrared unit 17.

Removable memory card 20 represents various exchangeable storage media such as a compact flash and a miniature card. It is possible to make an exchange of image data with other equipment through the removable memory card 20.

However, when it is possible to communicate with external equipment with serial driver 16 or with infrared unit 17, it is possible to arrange so that image data are stored in a memory fixed inside a digital camera in place of the removable memory card 20.

Figure 3:
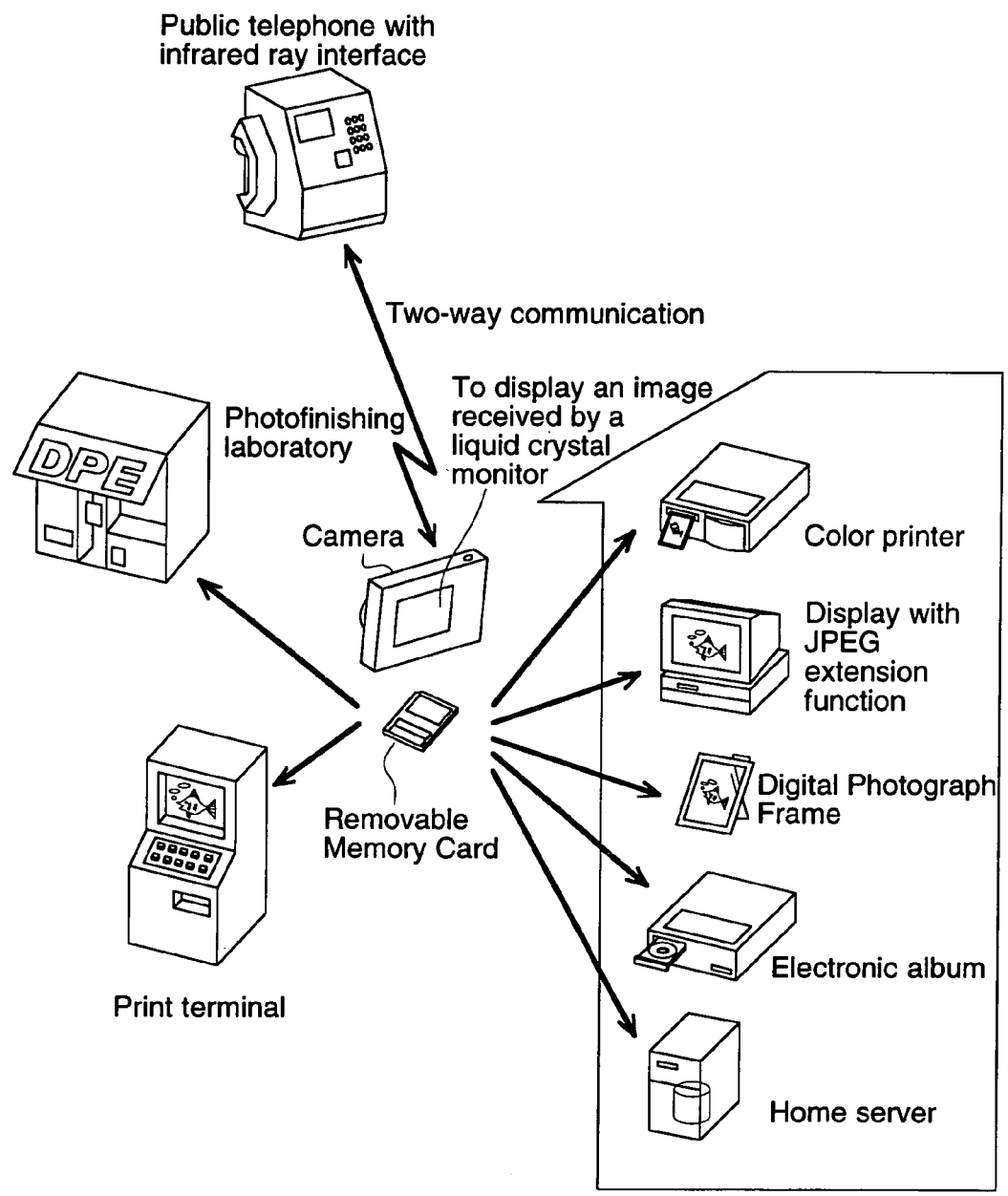
FIG. 3 is an illustration showing image data exchange among various devices.

As stated above, it is possible for the digital camera of the present embodiment to exchange image data with various equipment shown in FIG. 3.

Further, on the digital camera of the present embodiment, it is possible to reproduce image data having a format which is different from that of image data obtained through photographing by the digital camera. For example, when information of a map showing the road to the destination is received, it is possible to go to the destination while displaying the received information of a map on liquid crystal displaying section 15 of the digital camera, and in particular, when image data are received from the public telephone having an infrared ray communication interface to the digital camera, it is possible to utilize it while making use of portability of the digital camera. It is further possible to use infrared unit 17 also for range-finding use, which, in this case, can be realized with a small-sized camera.

Operation switch 30 includes various switches such as a power supply switch, a mode setting switch and a release switch, in which directives for operations of a digital camera are inputted.

Incidentally, in the structure shown in FIG. 1, there is shown an occasion wherein image processing such as image compression or image extension is conducted in CPU10 in accordance with processing programs, but an exclusive circuit for compression/extension may also be provided on a CPU bus.

(Basic operations of an electronic still camera)

In the case of a digital camera of the present embodiment, a device wherein CCD11 with the number of pixels of about 1,000,000–1,400,000 is used, and an image file format represents YCbCr 4:2:0 and image data of 1280×1000 pixels are generated as a standard mode will be explained as an example.

First, an operation mode of a camera is established through operation switch 30, and information for photographing is inputted in CPU10. Then, in accordance with this information, the CPU10 sets an operations of each section.

At this stage, digital image data obtained through photographing by CCD11 and processing by preprocess section 12 are displayed as an image on liquid crystal display section 15 through liquid crystal controller 14 in accordance with directives of CPU10.

When a release switch is depressed by operation switch 30, CPU10 issues an image input command. In response to this, CCD11 and preprocess section 12 operate and digital image data are supplied to CPU10.

The CPU10 conducts basic processing of signals for the received digital image data, and then prepares focus information from high frequency components of luminance data and prepares exposure data from low frequency components, and conducts an aperture driving, focus driving and further gain control for AGC amplifier of preprocess section 12, in case of need, so that proper exposure and proper focusing can be obtained.

The CPU10 generates digital image data in forms of Y, Cr and Cb at the timing based on the prescribed synchronization signals after the exposure value and a focusing value are converged to proper values. In this case, the CPU10 uses word memory 13 as a temporary work area and generates digital image data in forms of Y, Cr and Cb to store them in the work memory 13 temporarily.

Therefore, capacity of the word memory 13 is appropriate for processing of digital image data of 1280×1000 pixels with image file format representing YCbCr 4:2:0.

The CPU10 stores the digital image data with image file format representing YCbCr 4:2:0 thus generated in the removable memory card 20 to complete photographing and recording.

Incidentally, it is also possible to transfer the generated digital image data of forms of YCbCr 4:2:0 to external equipment through serial driver 16 or infrared unit 17.

After an operation of reproduction is made by operation switch 30, CPU10 issues commands for image reading and reproduction.

In response to this, digital image data with forms of YCbCr 4:2:0 stored in the removable memory card 20 are read by the CPU10. Then the CPU10 generates digital image data for display by taking extension processing on image data with forms of YCbCr 4:2:0, and thereby displays a color image on liquid crystal display section 15 through liquid crystal controller 14.

Further, as an outside input reproduction mode, it is also possible to receive digital image data of 1280×1000 pixels with forms of YCbCr 4:2:0 coming from the outside through serial driver 16 and infrared unit 17 through processing of the CPU10, and thereby to display them on liquid crystal display section 15 as a color image.

As stated above, with regard to the standard mode (image file format YCbCr 4:2:0, 1280×1000 pixels), recording/reproduction is possible for the removable memory card 20 and input in and output from external equipment are possible.

The digital camera of the present embodiment is constituted so that reproduction from the removable memory card 20 and input from external equipment may be possible even in the case of a mode (a second mode) other than the standard mode (a first mode).

In the second mode in this case, image file format of YCbCr 4:2:2 and 640×480 pixels are assumed. This is a mode corresponding to digital image data wherein the number of pixels is smaller and information quantity of color difference components are larger both compared with those in the standard mode of the digital camera of the present embodiment. This second mode is one corresponding to an image which is generally used in a digital camera which is more inexpensive.

When removable memory card 20 storing therein digital image data in the second mode is mounted on a digital camera, CPU10 discriminates data form (image file format, pixel size) by referring to a tag provided on digital image data.

When operation of reproduction is made with operation switch 30, CPU10 issues commands for image reading and reproduction if a data form is reproducible.

In response to this, digital image data with a form of YCbCr 4:2:2 stored in removable memory card 20 are read by CPU10. Then the CPU10 generates digital image data for display by taking extension processing on image data with a form of YCbCr 4:2:2, and thereby displays a color image on liquid crystal display section 15 through liquid crystal controller 14.

Incidentally, it is also possible to make an arrangement where digital image data with a form of YCbCr 4:2:2 are temporarily converted to digital image data with a form of YCbCr 4:2:0, and extension processing is made after this conversion. In this case, image display can be performed at higher speed because color difference information is made to be small in quantity. When an image display system is provided with a hardware capable of displaying digital image data with a form of YCbCr 4:2:0 at higher speed, still higher speed of image display is possible.

In this case, information quantity of color difference components is doubled by the change of an image file format to the form of YCbCr 4:2:2, but the capacity of work memory 13 does not come to be insufficient because the number of pixels in this case is smaller than that in the standard mode.

In the same way as in the foregoing, even when digital image data having a form of RGB 4:4:4 are stored in removal memory card 20, the CPU10 generates digital image data for display use and displays them on liquid crystal display section 15 as a color image through liquid crystal controller 14. Incidentally, in this case, extension processing is not needed because of non-compression, and it is possible to reproduce at high speed accordingly. Since digital image data with a form of RGB 4:4:4 are of non-compression, they are treated to be capable of being displayed even when the number of pixels in the longitudinal direction is not a multiple of 8 and the number of pixels in the lateral direction is not a multiple of 16.

In this case again, information quantity of color components is doubled by the change of an image file format to the form of RGB 4:4:4, but the capacity of work memory 13 does not come to be insufficient because the number of pixels in this case is smaller than that in the standard mode.

Incidentally, in this case, there has been explained an occasion wherein digital image data of the second mode are read from the removable memory card 20 to be reproduced, it is also possible that digital image data of the second mode are inputted from serial driver 16 or infrared unit 17 to be displayed.

(Effects to be obtained from the embodiment)

(i) As stated above, in the digital camera of the present embodiment, a recording format capable of recording in a prescribed form (recording/reproduction format: a first mode) and a reproduction format capable of reproducing in a prescribed form (a second mode) are set, and they are arranged so that the number of kinds of the reproduction format is greater than that of kinds of the recording format. As a result, image data in the image file formats of different standards can also be reproduced.

(ii) Further, in the digital camera of the present embodiment, there are provided the first mode to record and reproduce digital image data with the prescribed number of pixels and the second mode to reproduce digital image data having less number of pixels than in the first mode. As a result, image data in the image file formats of different standards can also be reproduced.

(iii) Still further, in the digital camera of the present embodiment, there are provided the first mode to record and reproduce digital image data with the prescribed number of pixels by means of luminance components with prescribed amount of information and color difference components and the second mode to reproduce digital image data having less number of pixels than in the first mode and being composed of color difference components with larger amount of information than in the first mode. As a result, it is possible to realize a digital camera capable of reproducing even image data in the image file formats of different standards.

(iv) In the digital camera of the present embodiment, there are provided an image processing means capable of reproducing even image data in the image file formats of different standards as in the items (1)–(3) above and a liquid crystal display section which displays thereon color image signals generated by the aforesaid image processing means as an image. As a result, it is possible to realize a digital camera capable of reproducing even image data in the image file formats of different standards.

OTHER EMBODIMENTS (1) When it is arranged, as in the foregoing, to read digital image data of a different image file format and to display them as the second mode, work memory 13 sometimes comes to be insufficient depending on an amount of information and the number of pixels of color difference (Cr and Cb) components and color (R, G and B) components.

(i) In that case, it is considered that a blank space of the removable memory card 20 is utilized as a work memory. In this case, there is a possibility, depending on read/write time for the removable memory card 20, that the time required for the work is slightly increased.

(ii) When work memory 13 is insufficient, it is possible to reduce an amount of memory to be used by giving extension processing only to luminance (Y) components of digital image data. In this case, monochromatic images are displayed.

(2) As the third mode, it is also possible to display an image with the number of pixels greater than that in the standard mode. Even in this case, work memory 13 sometimes comes to be insufficient, depending on an amount of information of the number of pixels, color difference (Cr and Cb) components and color (R, G, and B) components.

(i) In that case, it is considered that a blank space of the removable memory card 20 is utilized as a work memory. In this case, there is a possibility, depending on read/write time for the removable memory card 20, that the time required for the work is slightly increased. Or, it is also acceptable to display a part (any one of those including an initial portion, a central portion and a portion selected by a user) of pixels greater than those in the standard mode.

(ii) When work memory 13 is insufficient, it is possible to reduce an amount of memory to be used by giving extension processing only to luminance (Y) components of digital image data. In this case, monochromatic images are displayed. In this case, it is also acceptable either to display a part (any one of those including an initial portion, a central portion and a portion selected by a user) of pixels greater than those in the standard mode, or to display optionally with a scroll by using the saved memory area.

(3) Even in the case where digital image data having an image file format 4:0:0 and being subjected to JPEG compression of gray scale are stored in the removable memory card 20, it is possible to reproduce by treating with a mode other than the standard mode.

What is needed in this case represents digital image data on which only blocks of 8×8 pixels of luminance (Y) components are arranged. Therefore, an arrangement is made so that CPU10 reproduces by judging digital image data to be reproducible if the number of pixels in the longitudinal direction is a multiple of 8 and the number of pixels in the lateral direction is a multiple of 16.

(4) With regard to an image whose pixels are different in terms of number from those in the standard mode in each embodiment mentioned above, an image subjected to enlargement/reduction/alignment (parallel alignment) is generated through processing by CPU10 to be displayed on liquid crystal display section 15. In this case, in digital image data wherein the number of pixels is small and an amount of information of color difference components is small, an amount of work memory 13 to be used is reduced. Therefore, it is sometimes possible to display at higher speed than in the standard mode. For images with pixels the number of which is a half or less of that in the standard mode, it is also possible to display by designing a layout.

(5) The number of pixels and the image file format in each mode in each embodiment mentioned above represent just an example, and a numerical value and a format which are different from those in the foregoing make it possible to obtain the same effects.

As stated in detail above, the invention makes it possible to obtain the following effects.

(1) In the invention of a digital camera described in item 1, a recording format capable of recording in a prescribed form and a reproduction format capable of reproducing in a prescribed form are set, and they are arranged so that the number of kinds of the reproduction format is greater than that of kinds of the recording format, resulting in that image data in the image file formats of different standards can also be reproduced.

(2) In the invention of a digital camera described in item 2, there are provided the first mode to record and reproduce digital image data with the prescribed number of pixels and the second mode to reproduce digital image data having less number of pixels than in the first mode, resulting in that image data in the image file formats of different standards can also be reproduced.

(3) In the invention of a digital camera described in item 3, there are provided the first mode to record and reproduce digital image data with the prescribed number of pixels by means of luminance components with prescribed amount of information and color difference components and the second mode to reproduce digital image data having less number of pixels than in the first mode and being composed of color difference components with larger amount of information than in the first mode, resulting in that a digital camera capable of reproducing even image data in the image file formats of different standards can be realized.

(4) In the invention of a digital camera described in item 4, there is provided an image processing means capable of reproducing even image data in the image file formats of different standards as in the items (1)–(3) above, and it is arranged so that color image signals generated by the aforesaid image processing means can be displayed as an image by a display means, resulting in that a digital camera capable of reproducing even image data in the image file formats of different standards can be realized.

What is claimed is:

1. A portable camera being carried by an operator, comprising:
   a photographing section to photograph an object and to convert photoelectrically a photographed color image of the object into electrical image signals;
   a processing section to process the electrical image signals so as to output first color image data in the form of a first color data format to record color data of the photographed color image;
   a memory section in which a removable memory is accommodated, wherein the processing section records the photographed color image by storing the first color image data in the removable memory accommodated in the memory section;
   a color display section to display a color image, wherein the processing section processes the first color image data in the removable memory so that the color display section displays a color image corresponding to the first color image data;
   a terminal to transmit image data to an external device and to receive image data from an external device;
   wherein the portable camera is adapted to receive second color image data in the form of a second color data format different from the first color data format through the terminal from an external device to generate the second color data or by accommodating in the memory section a removable memory storing the second color image data generated by the external device,
   wherein the first color image data and the second color image data are digital image data including a data set of luminance data and color component data and the first color image data and the second color image data are different in data configuration of the color component data,
   wherein the color component data are represented by color difference data and the first color image data and the second color image data are different in data configuration of the color difference data,
   wherein the processing section processes the second color image data having the different configuration of the color difference data in such a way that the color display section displays a color image corresponding to the second color image data generated by the external device, and
   wherein the data configuration of the color difference data of one of the first color image data and the second color image data is Cr(Y−R):Cb(Y−B)=2:2 and that of the other one is Cr(Y−R):Cb (Y−B)=2:0.

2. The portable camera of claim 1, wherein the first color image data and the second color image data are different in number of pixels of the color difference data.

3. The portable camera of claim 1, wherein the terminal receives image data from one of an external computer, a portable information device, and a public telephone.

4. The portable camera of claim 1, wherein the terminal comprises an infrared unit.

5. The portable camera of claim 1, wherein the terminal comprises a serial driver to conduct a serial data transmission.

6. The portable camera of claim 1, wherein the processing section is adapted to convert the electrical image signals generated by the photographing section into only the first color image data in the form of the first color data format.

* * * * *